(12) United States Patent
Shi et al.

(10) Patent No.: US 11,368,827 B2
(45) Date of Patent: Jun. 21, 2022

(54) COMMUNICATION SYSTEM AND METHOD OF AUTONOMOUS VEHICLE AND TERMINAL DEVICE

(71) Applicant: BAIDU ONLINE NETWORK TECHNOLOGY (BEIJING) CO., LTD., Beijing (CN)

(72) Inventors: Yifeng Shi, Beijing (CN); Xing Hu, Beijing (CN); Haisong Wang, Beijing (CN); Lei Fang, Beijing (CN); Ji Tao, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 377 days.

(21) Appl. No.: 16/554,775

(22) Filed: Aug. 29, 2019

(65) Prior Publication Data

US 2020/0077242 A1 Mar. 5, 2020

(30) Foreign Application Priority Data

Aug. 31, 2018 (CN) .......................... 201811008174.7

(51) Int. Cl.
*H04W 4/48* (2018.01)
*G06F 9/54* (2006.01)
(Continued)

(52) U.S. Cl.
CPC ............ *H04W 4/48* (2018.02); *G05D 1/0088* (2013.01); *G06F 9/547* (2013.01); *H04W 4/46* (2018.02)

(58) Field of Classification Search
CPC ........... H04W 4/40; H04W 4/44; H04W 4/46; H04W 4/48; H04W 24/00; H04W 24/04; H04W 24/08; G05D 1/00; G05D 1/0022; G05D 1/0027; G05D 1/0088; G05D 1/02; G05D 1/0212; G06Q 30/00; G06Q 30/04; G08G 5/06; H04B 7/1851; H04B 7/18506;
(Continued)

(56) References Cited

U.S. PATENT DOCUMENTS

2017/0127230 A1 5/2017 Enriquez
2017/0257345 A1 9/2017 Westra et al.
(Continued)

FOREIGN PATENT DOCUMENTS

CN 203870689 U 10/2014
CN 104639654 A 5/2015
(Continued)

OTHER PUBLICATIONS

NPL_search (Nov. 5, 2021).*
(Continued)

*Primary Examiner* — Van T Trieu
(74) *Attorney, Agent, or Firm* — Fay Sharpe LLP

(57) ABSTRACT

Provided are a communication system and a communication method of an autonomous vehicle. The system includes: a plurality of application modules, and an in-vehicle terminal. The in-vehicle terminal includes: an external communication module configured to communicate with another autonomous vehicle or a server in a message mode, and an internal communication module configured to communicate with the plurality of application modules in a service mode.

14 Claims, 3 Drawing Sheets

(51) Int. Cl.
  *G05D 1/00* (2006.01)
  *H04W 4/46* (2018.01)
(58) Field of Classification Search
  CPC .. H04B 7/18582; H04B 7/18593; H04L 67/12
  See application file for complete search history.

(56) References Cited

U.S. PATENT DOCUMENTS

| | | | |
|---|---|---|---|
| 2018/0376357 A1* | 12/2018 | Tavares Coutinho | H04L 67/10 |
| 2019/0026796 A1* | 1/2019 | Dinis Da Silva De Carvalho | G06Q 30/04 |
| 2019/0113353 A1* | 4/2019 | Shimizu | G05D 1/0088 |
| 2021/0114616 A1* | 4/2021 | Altman | H04W 40/02 |

FOREIGN PATENT DOCUMENTS

| | | |
|---|---|---|
| CN | 107169100 A | 9/2017 |
| JP | 2005242375 A | 9/2005 |
| JP | 2008044391 A | 2/2008 |
| JP | 2012256241 A | 12/2012 |
| JP | 2016143399 A | 8/2016 |

OTHER PUBLICATIONS

Partial European Search Report for EP Application No. 19193048.6-1213, dated Dec. 2, 2019, 15 pages.

Office Action for Japanese Application No. 2019-122633, dated Sep. 23, 2020, 26 pages.

Miyata et al., "Recognition of Numbers on Speed Limit Signs Utilizing an Eigen Space Method", based on the KL Transform, The Institute of Electronics, Information and Communication Engineers and Informations Processing Society of Japan, 2012, 9 pages. (Abstract in English).

Office Action for Chinese Application No. 201811008174.7, dated Nov. 2, 2021, 7 pages.

* cited by examiner

COMMUNICATION SYSTEM AND METHOD OF AUTONOMOUS VEHICLE AND TERMINAL DEVICE

CROSS-REFERENCE TO RELATED APPLICATION

This application claims priority to and benefits of Chinese Patent Application Serial No. 201811008174.7, filed with the National Intellectual Property Administration of P. R. China on Aug. 31, 2018, the entire content of which is incorporated herein by reference.

FIELD

The present disclosure relates to the field of automotive communication technologies, and more particularly to communication system and method of an autonomous vehicle, and a terminal device.

BACKGROUND

In an automatic driving system, it is necessary to establish wireless communication among autonomous vehicles and to establish wireless communication between the autonomous vehicle and a server, so as to realize information transmission for example status information of the autonomous vehicle among different devices.

A new communication system with better reliability and security is still required for the automatic driving system.

SUMMARY

In an aspect, the present disclosure provides in embodiments a communication system of an autonomous vehicle, including: a plurality of application modules, and an in-vehicle terminal including an external communication module configured to communicate with another autonomous vehicle or a server in a message mode, and an internal communication module configured to communicate with the plurality of application modules in a service mode.

In another aspect, the present disclosure provides in embodiments a communication method of an autonomous vehicle including a communication system including a plurality of application modules, and an in-vehicle terminal comprising an external communication module and an internal communication module, and the communication method includes: the internal communication module communicating with the plurality of application modules in a service mode, and the external communication module communicating with another autonomous vehicle or a server in a message mode.

In still another aspect, the present disclosure provides in embodiments a terminal device, including a processor and a memory having stored executable procedure codes. The processor is configured to read the executable procedure codes stored in the memory and execute a computer program corresponding to the executable procedure codes, to perform a communication method of an autonomous vehicle as described above.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
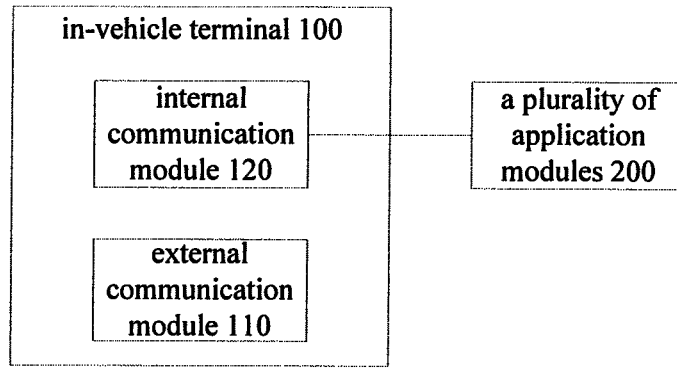
FIG. 1 is a block diagram illustrating a structure of a communication system of an autonomous vehicle according to an embodiment of the present disclosure.

Reference will be made in detail to embodiments of the present disclosure. The same or similar elements and the elements having same or similar functions are denoted by same or like reference numerals throughout the descriptions. The embodiments described herein with reference to drawings are explanatory, illustrative, and configured to generally understand the present disclosure. The embodiments shall not be construed to limit the present disclosure.

During communication among autonomous vehicles and communication between the autonomous vehicle and a server, as the number of devices increases, serious interference may occur in a single frequency band in which data is transmitted simultaneously among the multiple devices, which causes packet loss, random packet or error packet transmission, thus resulting in communication failures among the autonomous vehicles or between the autonomous vehicle and the server.

In a related art, a Socket communication method is applied to transmit data of the application layer to in-vehicle device(s), and also to another vehicle or a server. However, as a number of application scenarios in a vehicle increases, it is required to add more applications, and thus the Socket protocol between the application layer and the in-vehicle device(s) needs to be modified, resulting in poor flexibility unable to meet the flexible requirements when increasing or decreasing vehicle applications.

In view of this, with reference to the accompanying drawings, a communication system and a communication method of an autonomous vehicle and a terminal device are described below.

In an aspect, the present disclosure provides in embodiments a communication system of an autonomous vehicle.

FIG. 1 is a block diagram illustrating a structure of a communication system of an autonomous vehicle according to an embodiment of the present disclosure. As shown in FIG. 1, the system includes an in-vehicle terminal 100 and a plurality of application modules 200.

Specifically, the in-vehicle terminal 100 includes an external communication module 110 configured to communicate with another autonomous vehicle or a server, and an internal communication module 120 configured to communicate with the application module 200.

In this embodiment, a plurality of application modules 200 is configured to communicate with the internal communication module 120.

Specifically, the application modules 200 are configured to communicate with the internal communication module 120 in a service mode, respectively, and the external communication module 110 is configured to communicate with another autonomous vehicle or the server in a message mode.

In an embodiment, the service mode of the communication is a Remote Procedure Call (RPC) method.

In an embodiment, the message mode of the communication is a Socket method.

Specifically, in the autonomous vehicle, data of an application layer is transmitted to an in-vehicle device 100 by using a RPC framework. In other words, the application layer data of each of a plurality of application modules 200 is sent to the internal communication module 120 in the RPC mode. Further, the in-vehicle device 100 may summarize and encode the application layer data, and the external communication module 110 may send the application layer data to any other autonomous vehicle or any server in the Socket mode.

Further, the RPC framework includes, but is not limited to, a GRPC (a RPC framework developed by Google), a BRPC (a RPC framework developed by Baidu), and an Extensible Markup Language-RPC (XMLRPC).

In an embodiment, the service mode may be the RPC method or a Remote Method Invocation (RMI) method, and the message mode may be the Socket communication method or any other data-centric communication method.

It should be understood that the communication can be done in the service mode without a network technology protocol such as Socket, such that there is no need to change or modify the Socket protocol between the application layer and the in-vehicle device when an applicant is added or removed, thus improving the flexibility of application layer deployment.

With the communication system of the autonomous vehicle provided in the embodiments of the present disclosure, the internal communication module 120 of the in-vehicle terminal 100 is configured to communicate with a plurality of application modules 200 in the service mode and the external communication module 110 of the in-vehicle terminal 100 is configured to communicate with another autonomous vehicle or a server in the message mode. On this basis, the service mode for communication can be applied to realize span and improve the flexibility of the application layer deployment. For example, when a new application is needed, it can be directly registered. Different services are independent of each other and decoupled from each other, thus solving the problem of the poor flexibility when the number of vehicle applications increases or decreases in the related art.

Based on the above embodiments, the communication system of the autonomous vehicle of the present disclosure may be provided with a response function during data transmission, so as to improve the accuracy of the data transmission.

Figure 2:
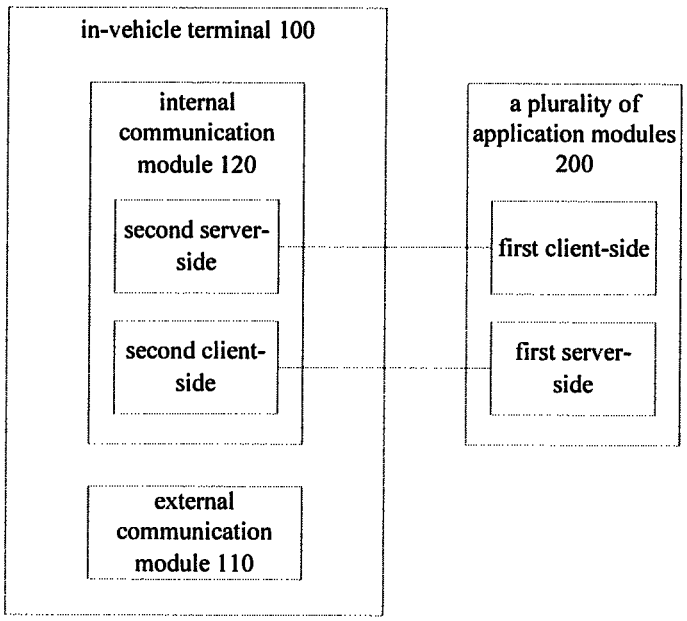
FIG. 2 is a block diagram illustrating a structure of a communication system of an autonomous vehicle according to another embodiment of the present disclosure.

FIG. 2 is a block diagram illustrating a structure of a communication system of an autonomous vehicle according to another embodiment of the present disclosure;

In the present embodiment, the plurality of application modules 200 includes a first client-side and a first server-side, the internal communication module 120 includes a second server-side configured to communicate with the first client-side, and a second client-side configured to communicate with the first server-side.

Specifically, when a plurality of application modules 200 transmits data to the in-vehicle device 100, a plurality of application modules 200 may be regarded as the client-side and the in-vehicle device 100 may be regarded as the server-side, such that, like the client-side accesses the server-side, a plurality of application modules 200 sends data to the server-side in a request form and the server-side sends a response message to the client-side according to the received data. When the in-vehicle device 100 transmits data to a plurality of application modules 200, the in-vehicle device 100 is regarded as the client-side and a plurality of application modules 200 may be regarded as the server-side, such that the in-vehicle device 100 sends data to a plurality of application modules 200 in a request form and receives responses from a plurality of application modules 200 at the same time.

In an embodiment, the first server-side is provided with a first service table in which the second client-side is registered to get an authority to communicate with the first server-side, and the second server-side is provided with a second service table in which the first client-side is registered to get a second authority to communicate with the second server-side. For example, the second client-side registers corresponding port information in the first service table of the first server-side, so as to get an authority to communicate with the first server-side. For another example, the first client-side registers corresponding port information in the second service table of the second server-side, so as to get an authority to communicate with the second server-side.

The communication system of the autonomous vehicle of the present disclosure may be provided with a response function during data transmission, so as to improve the accuracy of the data transmission. Moreover, by getting the communication authority according to the service table registration before the communication, the security and reliability of the data transmission are improved.

The communication between the in-vehicle terminal and another autonomous vehicle or a server will be described in detail below.

In an embodiment of the present disclosure, the external communication module 110 is further configured to: acquire data to be transmitted, encode the data to be transmitted to generate encoded data, and acquire a data length of the encoded data, generate a check code according to the data to be transmitted, add the encoded data into a packet in which the data length is included in a header of the packet and the check code is included in a trailer of the packet, and send the packet.

In an embodiment, a radar and a camera of the autonomous vehicle may acquire obstacle information and traffic light information, respectively, and the data to be transmitted is thus acquired according to the obstacle information and the traffic light information.

In another embodiment, status information and future trajectory information of the autonomous vehicle are acquired, and the data to be transmitted is thus acquired according to the status information and the future trajectory information.

Specifically, the status information of the autonomous vehicle includes position information, speed information, accelerating speed information and historical trajectory information. Further, the future trajectory information of the autonomous vehicle is generated according to the position information, the speed information, the accelerating speed information and the historical trajectory information of the autonomous vehicle.

In a further embodiment, the data to be transmitted is encoded by serialization.

With the communication system of the autonomous vehicle according to the embodiments of the present disclosure, the encoding of the data to be transmitted may compress the data, avoid random or error packets, and also improve the security of the data transmission. In addition, the vehicle can transmit the traffic light information, the vehicle status information, the obstacle information and the future trajectory information to other vehicles and server, and thus the server may manage the vehicles according to all the reported information and the vehicle may acquire running information of the other vehicles nearby and perform corresponding operations accordingly, thus improving the security of the automatic driving system.

In another aspect, the present disclosure provides in embodiments a communication method of an autonomous vehicle. The autonomous vehicle is provided with a communication system including a plurality of application modules, and an in-vehicle terminal. Specifically, the external communication module is configured to communicate with another autonomous vehicle or a server, and the internal communication module is configured to communicate with the application module, and a plurality of application modules is configured to communicate with the internal communication module.

Figure 3:
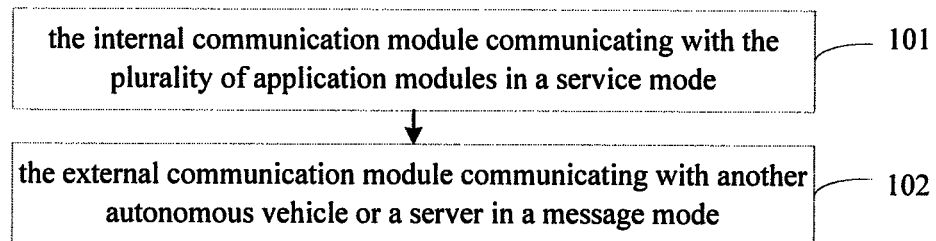
FIG. 3 is a flow chart of a communication method of an autonomous vehicle according to an embodiment of the present disclosure.

FIG. 3 is a flow chart of a communication method of an autonomous vehicle according to an embodiment of the present disclosure. As shown in FIG. 3, the method includes following steps.

In block 101, the internal communication module is communicated with a plurality of application modules in a service mode.

In an embodiment, an executive body is the in-vehicle device.

Specifically, the internal communication module is communicated with a plurality of application modules by a RPC method.

In an embodiment, a plurality of application modules includes a first client-side and a first server-side, and the internal communication module includes a second server-side configured to communicate with the first client-side, and a second client-side configured to communicate with the first server-side.

In an embodiment, the first server-side is provided with a first service table and the second server-side is provided with a second service table. The first client-side is registered in the second service table to allow the first client-side to get an authority to communicate with the second server, and the second client-side is registered in the first service table to allow the second client-side to get an authority to communicate with the first server-side.

In block 102, the external communication module is communicated with another autonomous vehicle or a server in a message mode.

Specifically, the external communication module is communicated with another autonomous vehicle or the server by a Socket method.

It should be understood that all of the above described features and advantages for the communication system in the above aspect are also applicable to the communication method, which will not be elaborated in detail herein.

With the communication method of the autonomous vehicle provided in the embodiments of the present disclosure, the internal communication module is communicated with a plurality of application modules in the service mode and the external communication module is communicated with another autonomous vehicle or the server in the message mode. On this basis, the service mode can be applied to realize span and improve the flexibility of the application layer deployment. For example, when a new application is needed, it can be directly registered. Different services are independent of each other and decoupled from each other, thus solving the problem of the poor flexibility when the number of vehicle applications increases or decreases in the related art. Moreover, the response function is added during the data transmission to improve the accuracy of the data transmission. In addition, by getting the communication authority according to the service table registration before the communication, the security and reliability of the data transmission are improved.

Based on the above embodiments, the communication between the in-vehicle terminal and another autonomous vehicle or a server will be described in detail below.

Figure 4:
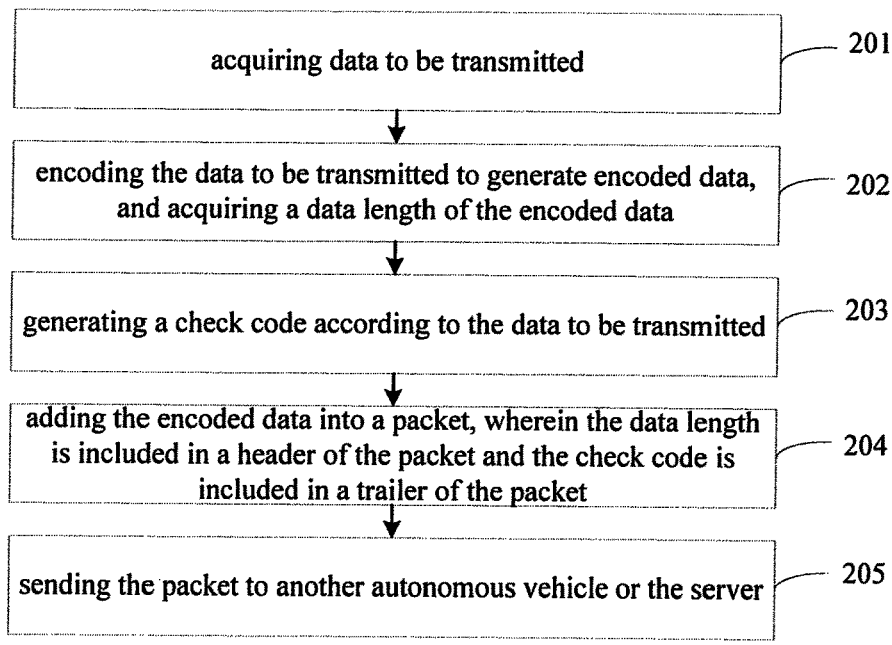
FIG. 4 is a flow chart of a communication method of an autonomous vehicle according to another embodiment of the present disclosure.

FIG. 4 is a flow chart of a communication method of an autonomous vehicle according to another embodiment of the present disclosure. As shown in FIG. 4, the method includes following steps.

In block 201, data to be transmitted is acquired.

In an embodiment, before the autonomous vehicle transmits data, the data to be transmitted should be acquired first. For example, obstacle information can be collected by radar of the autonomous vehicle, and then the data to be transmitted is generated according to the obstacle information. For another example, the traffic light information can be collected by a camera of the autonomous vehicle, and then the data to be transmitted is generated according to the traffic light information.

In block 202, the data to be transmitted is encoded to generate encoded data, and a data length of the encoded data is acquired.

In an embodiment, the data to be transmitted is serialized to generate the encoded data and to acquire the data length of the encoded data.

In an example, a serialization tool Protobuf is used to serialize the data to be transmitted, such that the data to be transmitted is serialized into binary data, and the data length of the serialized binary data is thus acquired. For example, the encoded data after serialization is "1001", and the data length of the encoded data is 4 bits.

In another embodiment, the data to be transmitted may also be character-encoded to generate encoded data, and the data length of the encoded data is acquired.

In block 203, a check code is generated according to the data to be transmitted.

In an embodiment, the encoded data to be transmitted may be calculated by a correlation algorithm, so as to generate the check code of the encoded data. In an example, a parity check code may be generated according to the parity of the encoded data. In another example, a polynomial may be generated by acquiring the encoded data, and a cyclic redundancy check code may be acquired according to the polynomial.

The check code includes, but is not limited to, a parity check code and a cyclic redundancy check code.

In an embodiment, the data to be transmitted may be directly calculated by a correlation algorithm to generate a check code.

In block 204, the encoded data is added into a packet in which the data length is included in a header of the packet and the check code is included in a trailer of the packet.

Figure 5:
FIG. 5 is a block diagram illustrating a structure of a packet according to an embodiment of the present disclosure.

In an embodiment, the encoded data is added to the packet, and the data length of the encoded data is added to the header of the packet and the check code is added to the trailer of the packet. In an embodiment, as shown in FIG. 5, a header of a packet includes an acknowledgment bit and a data length of the encoded data, and a trailer of the packet includes a check code.

In this embodiment, by adding the data length of the encoded data into the header of the packet, the data length of the encoded data in the header may be extracted first, and then the encoded data can be extracted from the packet according to the data length of the encoded data during decoding. Further, after the encoded data is extracted, it is also possible to perform verification based on the check code.

In block 205, the packet is sent to another autonomous vehicle or the server.

In an example, a Vehicle-to-X (V2X) communication technology may be used to send the packet to the server or other autonomous vehicles.

In another example, a Wireless-Fidelity (WIFI) may be used to send the packet to the server or other autonomous vehicles.

With the communication method of the autonomous vehicle according to the embodiments of the present disclosure, the data to be transmitted is acquired, the data to be transmitted is encoded to generate the encoded data, and the data length of the encoded data is acquired. Further, the check code is generated according to the data to be transmitted, the encoded data, the data length and the check code are added to the packet, and the packet is transmitted to the server or other autonomous vehicles. In this embodiment, by encoding the data to be transmitted, the data to be transmitted can be compressed, the data stream to be transmitted is reduced, and it can be ensured that no error packet and random packet occurs. Meanwhile, the encoding process may convert meaningful text into meaningless code, thus improving the security of the data transmission.

Figure 6:
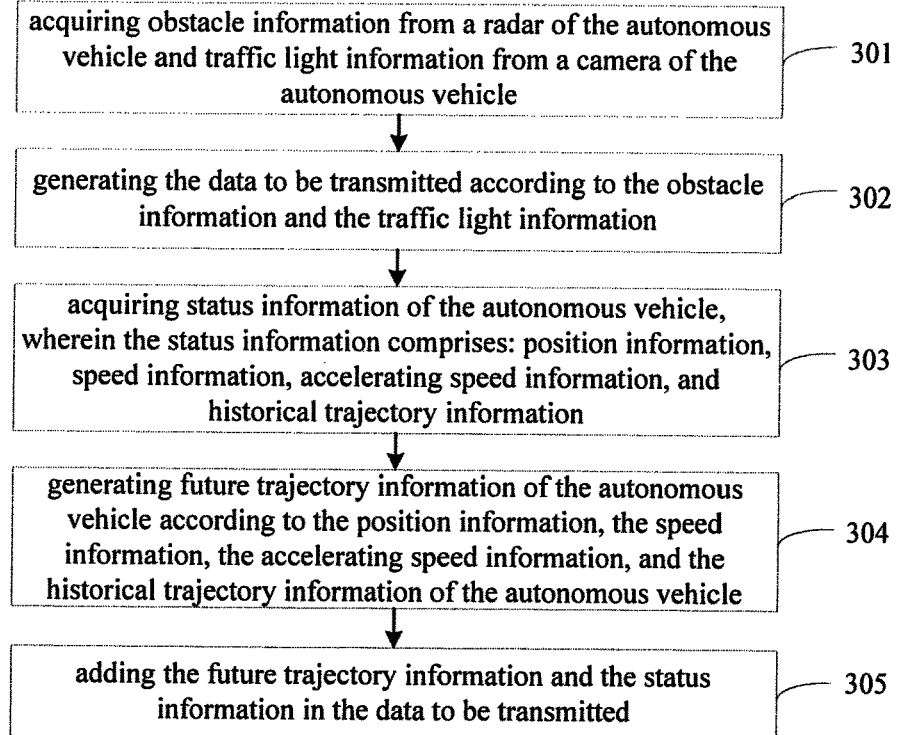
FIG. 6 is a flow chart of a communication method of an autonomous vehicle according to still another embodiment of the present disclosure.

FIG. 6 is a flow chart of a communication method of an autonomous vehicle according to still another embodiment of the present disclosure. As shown in FIG. 6, the method includes following steps.

In block 301, obstacle information is acquired from a radar of the autonomous vehicle and traffic light information is acquired from a camera of the autonomous vehicle.

In block 302, the data to be transmitted is generated according to the obstacle information and the traffic light information.

In an example, the obstacle information is collected by the radar of the autonomous vehicle, and the data to be transmitted is generated according to the obstacle information. Specifically, the obstacle information includes position and size information of the obstacles.

In another example, the traffic light information is collected by the camera of the autonomous vehicle, and the data to be transmitted is generated according to the traffic light information. Specifically, the traffic light information includes position information and current status information of the traffic light.

In block 303, status information of the autonomous vehicle is acquired, the status information includes: position information, speed information, accelerating speed information, and historical trajectory information.

In an embodiment, the position information of the autonomous vehicle may be acquired in real time by a positioning system of the autonomous vehicle, and the historical track information is generated according to the position information. Moreover, the speed information is acquired by a speed sensor and the accelerating speed information is acquired by an accelerating speed sensor.

In another embodiment, a gyroscope may be used to acquire direction information of the autonomous vehicle, and thus the speed and the accelerating speed may be vectors.

In block 304, future trajectory information of the autonomous vehicle is generated according to the position information, the speed information, the accelerating speed information, and the historical trajectory information of the autonomous vehicle.

In an embodiment, a displacement of the autonomous vehicle in a future preset time interval may be acquired according to the current speed and the accelerating speed by a suitable algorithm, and the future trajectory information of the autonomous vehicle may be generated according to the historical trajectory information, the position information and the displacement.

For example, a speed v and an accelerating speed a may be calculated according to plane displacement integral, and a displacement s of the autonomous vehicle in a future preset time interval t is acquired. Further, on the basis of current self-position information A and the displacement s of the autonomous vehicle, self-position information B after a duration t is acquired. A trajectory in a further duration t may be acquired according to the self-position information A and B, and such a trajectory is used as well as the historical trajectory information to generate the future trajectory information of the autonomous vehicle.

Specifically, the preset time interval may be acquired by large amount of experimental data, or may be set by a user according to actual requirements, and thus shall not be construed to limit the present disclosure.

In block 305, the future trajectory information and the status information are added in the data to be transmitted.

In an embodiment, the future trajectory information and the vehicle status information is also added to the data to be transmitted, and the data to be transmitted is sent by the autonomous vehicle to the server or any other autonomous vehicle, and then the server or the other autonomous vehicle receives and analyzes the data to be transmitted. Therefore, the server may manage the vehicles according to the above information and the vehicle may acquire running information of other surrounding vehicles, so as to ensure intelligent driving of the vehicle.

In an embodiment, driving operations may be controlled by an application layer of the server or other autonomous vehicle according to the future trajectory information of the autonomous vehicle. For example, the server receives future trajectory information a of an autonomous vehicle A and future trajectory information b of an autonomous vehicle B, and the future trajectory information a and b are analyzed by the application layer of the server to learn that the autonomous vehicles A and B will collide in their current trajectories. On this basis, the autonomous vehicles A and B are controlled and adjusted, for example to change their speeds or directions, thus ensuring the security and reliability of automatic driving.

With the communication method of the autonomous vehicle according to the embodiments of the present disclosure, the traffic light information, the vehicle status information, the obstacle information and the future trajectory information may be sent to other vehicles and server. On this basis, the server may manage the vehicles according to all the reported information and the vehicle may acquire running information of the other vehicles nearby and perform corresponding operations accordingly, thus improving the security of the automatic driving system.

In still another aspect, the present disclosure provides in embodiments a terminal device including a processor, and a memory having stored executable procedure codes. The processor is configured to read the executable procedure codes stored in the memory and execute a computer program corresponding to the executable procedure codes, to perform a communication method of an autonomous vehicle as described above.

In a further aspect, the present disclosure provides in embodiments a computer product having stored therein instructions that, when executed by a processor of a device, causes the device to perform a communication method of an autonomous vehicle as described above.

In a further aspect, the present disclosure provides in embodiments a non-temporary computer-readable storage medium having stored therein computer programs that, when executed by a processor, cause the processor to perform a communication method of an autonomous vehicle as described above.

Figure 7:
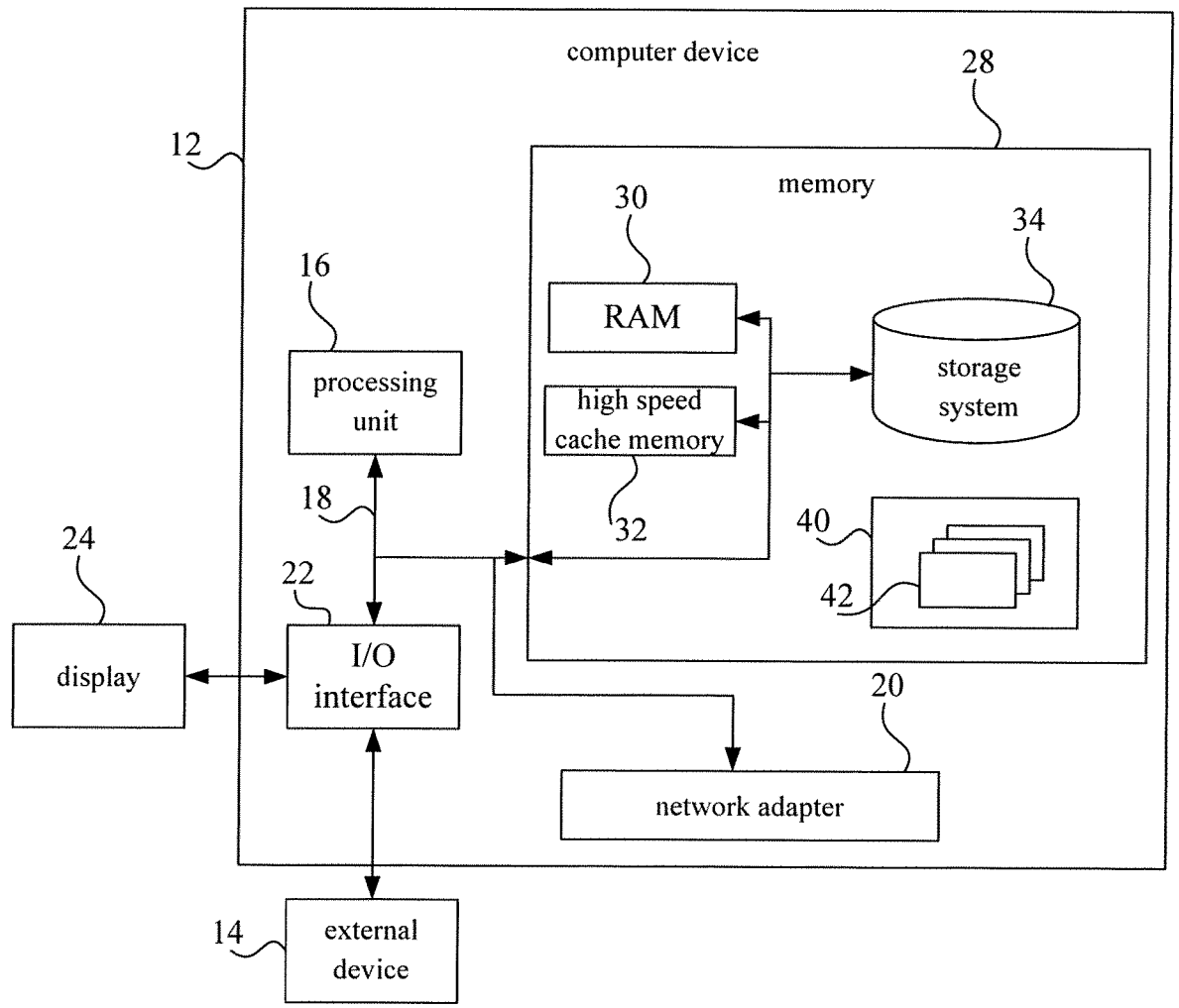
FIG. 7 is a block diagram showing a terminal device according to an embodiment of the present disclosure.

FIG. 7 is a block diagram showing a computer device according to an embodiment of the present disclosure. The computer device 12 shown in FIG. 7 is illustrated and shall not be construed to limit the present disclosure.

As illustrated in FIG. 7, the computer device 12 may be represented via a general computer device form. Components of the computer device 12 may be but are not limited to one or more processors or processing units 16, a system memory 28, a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures may be, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (hereinafter referred to as PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random access memory 30 (hereinafter referred to as RAM) and/or a high speed cache memory 32. The computer device 12 may further include other removable or non-removable, volatile or non-volatile computer system storage media. By way of example only, the storage system 34 may be configured to read and write a non-removable and non-volatile magnetic media (not shown in FIG. 7, commonly referred to as a "hard drive"). Although not shown in FIG. 7, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via the input/output (I/O) interface 22. Moreover, the computer device 12 may communicate with one or more networks (such as a local area network (hereafter referred to as LAN), a wide area network (hereafter referred to as WAN) and/or a public network such as an Internet) through a network adapter 20. As shown in FIG. 7, the network adapter 20 communicates with other modules of the computer device 12 over the bus 18. It should be understood that, although not shown in FIG. 7, other hardware and/or software modules may be used in connection with the computer device 12. The hardware and/or software includes, but is not limited to, microcode, device drivers, redundant processing units, external disk drive arrays, RAID systems, Drive and data backup storage system.

The processing unit 16 is configured to execute various functional applications and data processing by running programs stored in the system memory 28, for example, implementing the method for recommending an answer to a question based on artificial intelligence provided in embodiments of the present disclosure.

It should be understood that in this specification, terms such as "first" and "second" are used herein for purposes of description and are not intended to indicate or imply relative importance or significance. Thus, the feature defined with "first" and "second" may include one or more this feature. In the description of the present disclosure, unless specified otherwise, "a plurality of" means two or more than two, for example, two or three.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A communication system of an autonomous vehicle, comprising:
   a plurality of application modules, and
   an in-vehicle terminal comprising:
      an external communication module configured to communicate with another autonomous vehicle or a server in a message mode, wherein the message mode is a Socket mode, and
      an internal communication module configured to communicate with the plurality of application modules in a service mode, wherein the service mode is a remote procedure call (RPC) mode.

2. The communication system according to claim 1, wherein the plurality of application modules comprises a first client-side and a first server-side, the internal communication module comprises a second server-side configured to communicate with the first client-side, and a second client-side configured to communicate with the first server-side.

3. The communication system according to claim 2, wherein the first server-side is provided with a first service table in which the second client-side is registered to get an authority to communicate with the first server-side, and the second server-side is provided with a second service table in which the first client-side is registered to get an authority to communicate with the second server-side.

4. The communication system according to claim 1, wherein the external communication module is further configured to:
   acquire data to be transmitted,
   encode the data to be transmitted to generate encoded data, and acquire a data length of the encoded data,
   generate a check code according to the data to be transmitted,
   add the encoded data into a packet, wherein the data length is included in a header of the packet and the check code is included in a trailer of the packet, and
   send the packet.

5. The communication system according to claim 4, wherein the data to be transmitted comprises:
   obstacle information acquired from a radar of the autonomous vehicle, and traffic light information acquired from a camera of the autonomous vehicle.

6. The communication system according to claim 5, wherein the data to be transmitted further comprises:
   status information of the autonomous vehicle, comprising position information, speed information, accelerating speed information and historical trajectory information, and
   future trajectory information of the autonomous vehicle generated according to the position information, the speed information, the accelerating speed information and the historical trajectory information of the autonomous vehicle.

7. The communication system according to claim 4, wherein the data to be transmitted is encoded by serialization.

8. A communication method of an autonomous vehicle comprising a communication system, wherein the communication system comprises: a plurality of application modules, and an in-vehicle terminal comprising an external communication module and an internal communication module, and
   the communication method comprises:
      the internal communication module communicating with the plurality of application modules in a service mode, wherein the service mode is a RPC mode, and
      the external communication module communicating with another autonomous vehicle or a server in a message mode, wherein the message mode is a Socket mode.

9. The communication method according to claim 8, wherein
   the plurality of application modules comprises a first client-side and a first server-side,
   the internal communication module comprises a second server-side configured to communicate with the first client-side, and a second client-side configured to communicate with the first server-side,
   the first server-side is provided with a first service table and the second server-side is provided with a second service table,
   wherein before the internal communication module communicating with the plurality of application modules in the service mode, the method further comprises:
   registering the first client-side in the second service table to allow the first client-side to get an authority to communicate with the second server, and
   registering the second client-side in the first service table to allow the second client-side to get an authority to communicate with the first server-side.

10. The communication method according to claim 8, wherein the external communication module communicating with another autonomous vehicle or the server in the message mode comprises:
   acquiring data to be transmitted,
   encoding the data to be transmitted to generate encoded data, and acquiring a data length of the encoded data,
   generating a check code according to the data to be transmitted,
   adding the encoded data into a packet, wherein the data length is included in a header of the packet and the check code is included in a trailer of the packet, and
   sending the packet to another autonomous vehicle or the server.

11. The communication method according to claim 10, wherein acquiring the data to be transmitted comprises:
   acquiring obstacle information from a radar of the autonomous vehicle and traffic light information from a camera of the autonomous vehicle, and
   generating the data to be transmitted according to the obstacle information and the traffic light information.

12. The communication method according to claim 11, wherein acquiring the data to be transmitted comprises:
   acquiring status information of the autonomous vehicle, wherein the status information comprises: position information, speed information, accelerating speed information, and historical trajectory information,
   generating future trajectory information of the autonomous vehicle according to the position information, the speed information, the accelerating speed information, and the historical trajectory information of the autonomous vehicle, and
   adding the future trajectory information and the status information in the data to be transmitted.

13. The communication method according to claim 10, wherein encoding the data to be transmitted comprises:
   serializing the data to be transmitted.

14. A terminal device, comprising:
   a non-transitory processor; and
   a memory having stored executable procedure codes;
   wherein the non-transitory processor is configured to read the executable procedure codes stored in the memory and execute a computer program corresponding to the executable procedure codes, to perform a communication method of an autonomous vehicle comprising:
   an internal communication module communicating with a plurality of application modules in a service mode, wherein the service mode is a RPC mode and
   an external communication module communicating with another autonomous vehicle or a server in a message mode, wherein the message mode is a Socket mode.

* * * * *